Dec. 15, 1959 F. W. ROHE Re. 24,753

OVERHEAT SWITCH INSULATOR LOCK NUT

Original Filed Nov. 5, 1954

INVENTOR.
FREDERICK W. ROHE
BY
Lynn H. Latta
-ATTORNEY-

United States Patent Office

Re. 24,753
Reissued Dec. 15, 1959

24,753

OVERHEAT SWITCH INSULATOR LOCK NUT

Frederick W. Rohe, Placentia, Calif., assignor, by mesne assignments, to Shur-Lok Corporation, Anaheim, Calif., a corporation of California Original No. 2,826,631, dated March 11, 1958, Serial No. 467,181, November 5, 1954. Application for reissue July 14, 1959, Serial No. 829,953

7 Claims. (Cl. 174—138)

Matter enclosed in heavy brackets [ ] appears in the original patent but forms no part of this reissue specification; matter printed in italics indicates the additions made by reissue.

This invention relates to an insulator nut for over-heat switch*es* [as] such as are used in various location*s* in airplanes, and for other uses where dielectric properties are advantageous. The general object of the invention is to provide a nut which will serve as a cover for a normally exposed stud of such a switch or other device.

Another object is to provide such a cover nut having dielectric means to fully shield any object coming into proximity therewith, against grounding the device on which the nut is threaded, or otherwise establishing electrical contact therewith.

Another object is to provide a nut having an exceptionally high corrosion resistance.

A further object is to provide such a cover nut having means to lock it securely to a threaded stud, to the end that the nut may not come loose under the effect of vibration.

Another object is to provide such a nut having means to prevent galling of its threads on the threads of an overheat switch, when the nut is being turned at high temperatures.

Other objects will become apparent in the ensuing specifications and appended drawings in which.

Figure 1:
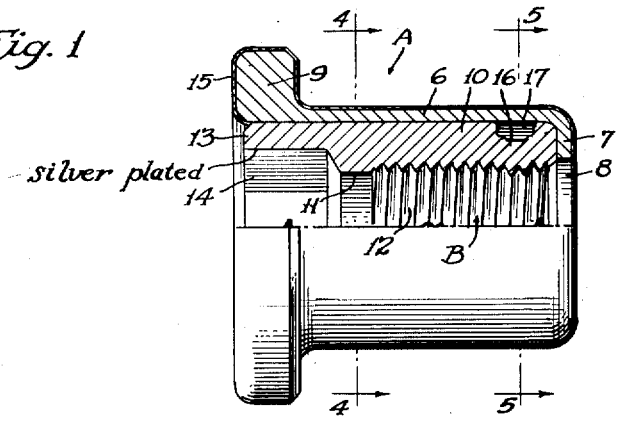
Fig. 1 is a side view, partially in axial section, of a nut embodying the invention.

Referring now to the drawings in detail, my improved switch cover nut is of composite structure, embodying a shell A and an internally threaded insert B, press-fitted therein.

Shell A includes a cylindrical barrel 6, an inturned flange 7 at one end thereof, defining a circular opening 8, and a rim 9 projecting radialy outwardly from its other end.

Insert B comprises a cylindrical body 10 contained within shell A, having a cylindrical outer wall press fitted to the cylindrical inner wall of shell A and having a forward end abutted against end flange 7 of the shell. Body 10 has a bore 11 which is provided with an internal thread 12 extending from said forward end to a point somewhat beyond the center of the body. The base diameter of thread 12 is substantially the same as the diameter of opening 8. At its rear end, body 10 has a reduced thickness portion 13 which defines a socket 14 of polygonal cross-sectional contour, providing wrenching faces for mating with a wrench used in turning the nut.

Shell A is completely covered, on its external surfaces, with a dielectric ceramic coating 15, which shields any external object coming in contact with the nut, from electrical connection with the overheat switch and, conversely, shields the switch from being shorted by any conductor contacting the nut. Thus the nut itself functions as an insulator covering for the switch.

The interior of body 10 is silver plated to eliminate galling of thread 12 when the nut is being rotated on a switch element of the same material as the nut body 10, at high temperature.

Figure 5:
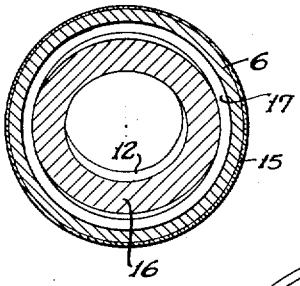
Fig. 5 is a transverse sectional view taken on the line 5—5 of Fig. 1.
Figure 3:
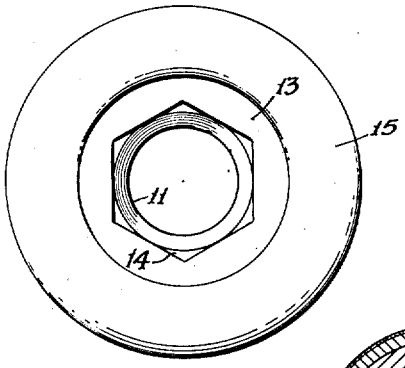
Fig. 3 is a rear end view thereof.
Figure 2:
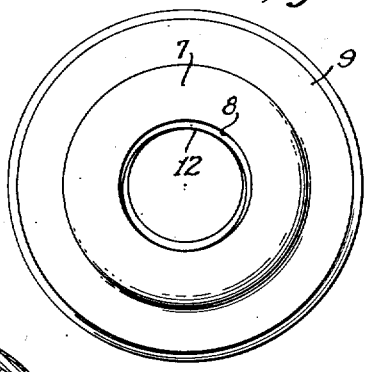
Fig. 2 is a front end view thereof.
Figure 4:
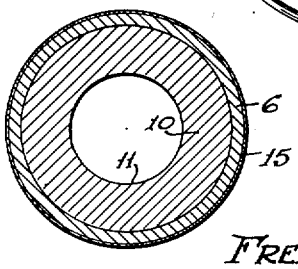
Fig. 4 is a transverse sectional view taken on the line 4—4 of Fig. 1.

The forward end of nut body 10 has a thinned neck portion 16, defining the bottom of an annular external groove 17. Neck portion 16 is [ovalated (]deformed under pressure (*e.g.* to an oval cross section as indicated in Fig. 5) whereby to provide a thread lock to bind the nut securely to the switch element, resisting any tendency to come loose under the effect of vibration.

The opening 8 provides for passage of the threaded stud of an *overheat* [overhead] switch through the shell A for threading into threaded portion 12 of bore 11. Socket 14 coacts with an Allen wrench for driving the nut onto the switch stud or removing it. The rear end of nut insert B is recessed inwardly from the end face of rim 15, to minimize the possibility of accidental contact between any external object and the insert.

The ceramic coating, completely covering the external surfaces of the nut, provides a greatly improved resistance to corrosion, even in the presence of highly corrosive fluids (such as the atmosphere in the vicinity of a large body of salt water).

I claim:

1. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, and including a radially outwardly extending rim at said other end of the nut, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being of oval cross-section to provide a thread lock for locking the nut against rotation on said stud; said shell body covering and bridging across said groove and supporting the sections of said shell body on opposite sides of said groove.

2. In an overheat switch insulator nut: a cylindrical insert having an axial bore, internally threaded at one end of the nut for reception of and threaded connection with a threaded stud of an overheat switch, and having a wrench socket at the other end of the nut; a shell including a cylindrical tubular body receiving and press-fitted upon said insert, including an annular inturned flange at said one end of the nut, said inturned flange covering the adjacent end of the insert and defining an opening of approximately the same diameter as said thread, for reception of said threaded stud, and said shell including a radially outwardly extending rim at said other end of the nut; and a coating of insulating material covering and restricted to the external surfaces of said shell, to constitute the nut an insulating cover for said switch stud, said shell constituting a base for said insulating coating.

3. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, and including a radially outwardly extending rim at said other end of the nut, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being of non-circular cross-section to provide a thread lock for locking the nut against rotation on said stud; said shell body covering and bridging across said groove and providing support for the sections of said insert on opposite sides of said groove; said shell constituting a base for said insulating coating.

4. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being of non-circular cross-section to provide a thread lock for locking the nut against rotation on said stud; said shell body covering and bridging across said groove and providing support for the sections of said insert on opposite sides of said groove.

*5. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being of generally oval cross-section to provide a thread lock for locking the nut against rotation on said stud; said shell body covering and bringing across said groove and providing support for the sections of said insert on opposite sides of said groove.*

*6. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, and including a radially outwardly extending rim at said other end of the nut, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being deformed radially inwardly to provide a thread lock for locking the nut against rotation on said stud; said shell body covering and bridging across said groove and providing support for the sections of said insert on opposite sides of said groove; said shell constituting a base for said insulating coating.*

*7. In an overheat switch insulator nut: an insert having an axial bore, internally threaded at one end of the nut for reception of and threaded connection with a threaded stud of an overheat switch, and having a wrenching socket at the other end of the nut; a shell including a tubular body receiving and press-fitted upon said insert, including an annular inturned flange at said one end of the nut, covering the adjacent end of said insert, said inturned flange defining an end opening through which said stud may be received; and a coating of insulating material covering the external surfaces of said shell, to constitute the nut an insulating cover for said switch stud; said insert, at said one end of the nut, having an annular external groove and a reduced thickness neck portion defining the bottom of said groove, said neck portion being deformed radially inwardly to provide a reduced diameter thread section for locking the nut against rotation on said stud; said shell body covering and bridging across said groove and supporting the sections of said shell body on opposite sides of said groove; said shell constituting a base for said insulating coating.*

References Cited in the file of this patent or the original patent

UNITED STATES PATENTS

| | | |
|---|---|---|
| 332,540 | Law | Dec. 15, 1885 |
| 375,294 | Johns | Dec. 20, 1887 |
| 2,385,991 | Huntoon | Oct. 2, 1945 |

FOREIGN PATENTS

| | | |
|---|---|---|
| 665,544 | Great Britain | Jan. 23, 1952 |